June 24, 1930.  W. M. BROWER  1,767,117
RADIO COMPASS COMPENSATOR
Filed June 1, 1925
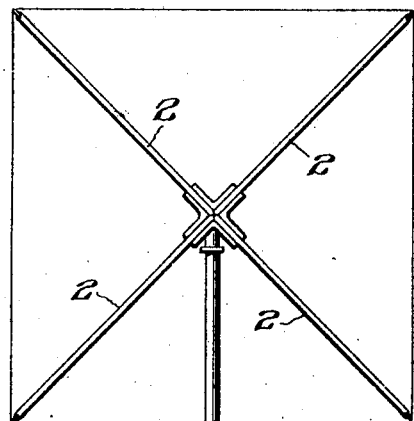
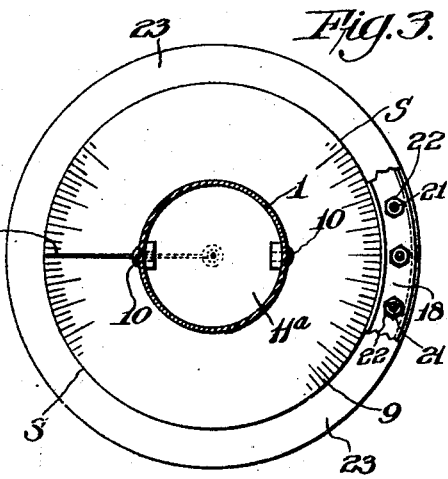
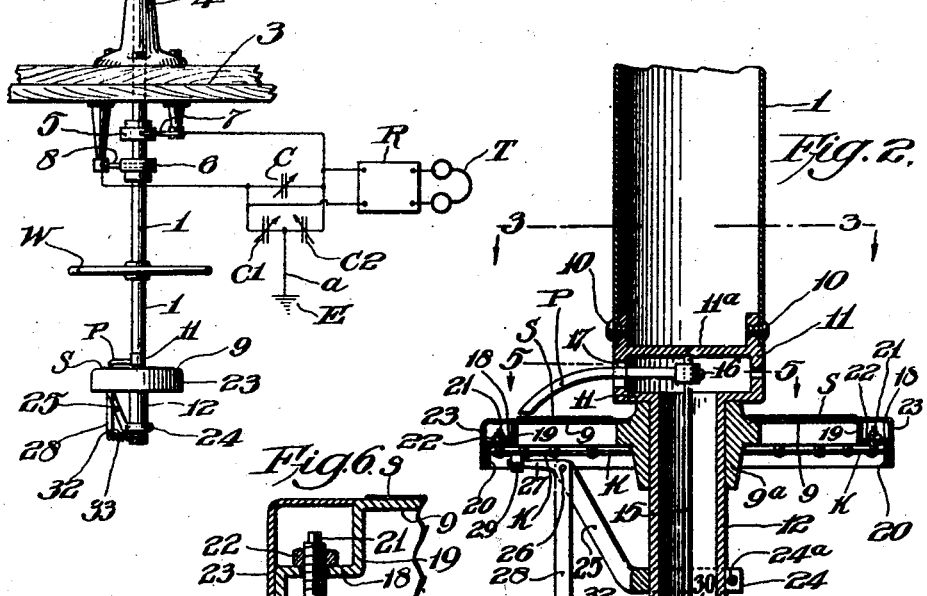
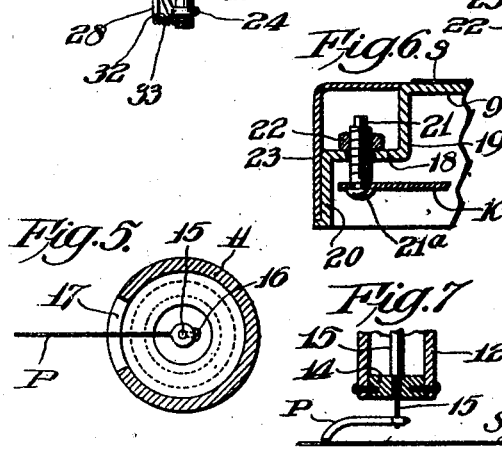
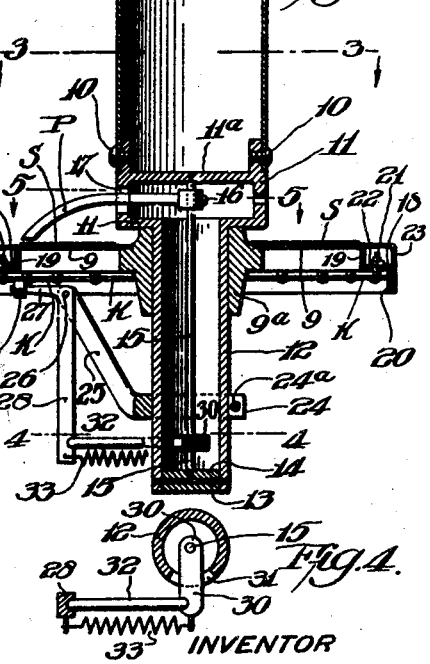
INVENTOR
William M. Brower
BY
Cornelius L. Ehret
HIS ATTORNEY.

Patented June 24, 1930

1,767,117

UNITED STATES PATENT OFFICE

WILLIAM M. BROWER, OF PALO ALTO, CALIFORNIA, ASSIGNOR TO FEDERAL TELEGRAPH COMPANY, OF SAN FRANCISCO, CALIFORNIA, A CORPORATION OF CALIFORNIA

RADIO COMPASS COMPENSATOR

Application filed June 1, 1925. Serial No. 34,006.

My invention relates to structure for automatically effecting corrections, compensation or control, and particularly in radio direction finding apparatus or radio compasses.

In accordance with my invention, in structure for automatically effecting corrections in radio compasses or radio direction finders or for automatically effecting in indicating mechanism predetermined relative movements of parts thereof, there is utilized a deformable cam whose cam face is disposed substantially normal to the axis of the rotatable member of indicating mechanism, such as the rotatable coil or rotatable electrical element of a radio compass or direction finding system.

My invention resides in features of construction and arrangement of parts of the character hereinafter described and claimed.

For an illustration of some of the various forms my apparatus may take, reference is to be had to the accompanying drawing, in which:

Fig. 1 is an elevational view of apparatus embodying my invention, in association with a diagram of a direction-finding circuit.

Fig. 2 is an enlarged vertical sectional view, some parts in elevation, of structure shown in Fig. 1.

Fig. 3 is a horizontal sectional view, partly in plan, taken on the line 3—3 of Fig. 2.

Fig. 4 is a horizontal sectional view, partly in plan, taken on the line 4—4 of Fig. 2.

Fig. 5 is a horizontal sectional view, partly in plan, taken on the line 5—5 of Fig. 2.

Fig. 6 is a fragmentary sectional view, on enlarged scale, of structure shown in Fig. 2.

Fig. 7 is a fragmentary sectional view, partly in elevation, illustrating a modification.

Referring to Fig. 1, the shaft 1 represents generically the rotatable element or shaft of indicating apparatus and, more specifically, the rotatable shaft carrying the rotatable direction finding or indicating element of a radio direction finding system or radio compass. Upon the shaft 1 is carried the frame 2 of a rotatable coil A, of a direction finding or radio compass system, such, for example, as a bearing or direction finding coil which absorbs the radiant energy from a distant radio beacon or distant radio transmitter directly from the natural media, or such as a goniometer coil constituting, as well understood in the art, a rotatable secondary coil inductively related to primaries disposed, respectively, in antenna circuits or loop paths having their planes fixed and substantially at right angles to each other.

In the example illustrated, the coil A is disposed above the roof 3 of the pilot house of a ship, upon which is disposed the bearing 4 for the shaft 1, which extends below the roof 3 into the interior of the pilot house. The terminals of the coil A, which may have a plurality of turns, suitably spaced from each other, as well understood in the art, connect, respectively, to the slip rings 5 and 6, rotatable with the shaft 1, and upon which bear the brushes 7 and 8, respectively, from which connections are made to the circuits of the directional receiving system. In the example illustrated, there is connected across the brushes 7 and 8 the variable tuning condenser C, which is in series with the coil A, for tuning the closed circuit to the frequency of the energy received from the distant beacon or transmitting station. Connected in series with each other and in shunt to the condenser C are the complementarily variable condensers C1 and C2, from a point between which is made a connection $a$ to earth, ships hull or counter-capacity E, the condensers C, C1 serving to effect symmetry of the closed circuit with respect to the earth connection $a$. In shunt to the condenser C is connected the input of the receiving apparatus R, comprising, for example, one or more stages of radio frequency amplification, followed by a detector, followed in turn by one or more audio frequency amplifiers in the anode circuit of the last of which is connected the signal translating instrument or telephone T.

Secured upon the shaft 1 is the hand wheel W, by means of which the operator rotates the coil A to determine the apparent bearing or direction of the distant beacon or transmitter.

Because of metallic or conducting masses adjacent the receiving apparatus, the wave front of the energy emitted from the distant beacon or transmitter is distorted, and, in consequence, the direction or bearing found by suitably adjusting the position of the coil A is merely the apparent bearing, and not the true bearing of the distant beacon or transmitter.

For correcting for the wave front distortion, there is utilized apparatus of the character now to be described.

Upon the fixed member or housing 9 is disposed the bearing or directional scale S, such, for example, as a dumb compass card. With the scale S co-operates the pointer or indicator P, whose position with respect to the coil A or shaft 1 is varied in accordance with the wave front distortion, in such sense and to such extent as to correct or compensate for the wave front distortion, and therefore to take a position corresponding with the true bearing or direction of the distant radio beacon or transmitter.

For this purpose there is secured to the lower end of the hollow shaft 1, by the screws 10, the casing or hollow member 11 having the downwardly extending tubular member 12, to which is secured by pin 13 the block or member 14, upon which bears at its lower end the pointer shaft 15, which at its upper end has a bearing in the member 11ª of the casing 11. The pointer P is secured by screw 16 to the pointer shaft 15, and extends through the slot or arcuate aperture 17 in the casing member 11, the aperture or slot 17 having sufficient arcuate extent about the axis of the shafts 1 and 15 to permit sufficient relative movement of the pointer P with respect to the shaft 1 for all necessary degrees of correction or compensation.

The fixed member 9 is secured to the fixed hub 9ª, through or in which the tubular member 12 extends or has a bearing.

At its periphery the circular member 9 has a horizontal flange 18 connected to the member 9 by the vertical cylindrical wall 19 and having the downwardly extending cylindrical flange 20. Threaded in the horizontal flange 18 and spaced substantially uniformly from each other circumferentially thereof is the circumferential series of screws 21. Each screw 21 extends at its lower end freely through an aperture in a cam plate K, and at its lower end has the head 21ª, between which and the shank of the screw 21 the cam plate K is confined. At its upper end each screw 21 is preferably provided with a screw driver slot or with a squared end for a socket wrench, whereby each screw may be adjusted vertically with respect to the ledge or flange 18 and thereby determine the position longitudinally of the axis of the shaft 1 of the lower or cam face of the deformable cam member K by raising or lowering it locally.

Having predetermined the wave front distortion throughout an entire circumference, the screws 21 are adjusted to cause the lower or cam face of the member K to be distorted or warped to represent the wave front distortion throughout the circumference of the cam K. Once the screws have been properly adjusted for this purpose, they are locked in position by their respective locking nuts 22, and there is then put in place the shield or cover member 23 housing or enclosing the ledge 18, screws and nuts, and fitting upon the flange 20 of the member 9.

Upon the split ring 24, clamped to the member 12 by clamping screw 24ª, is the upwardly extending bracket 25, to which there is pivoted at 26 the bell crank lever having the arms 27 and 28. Upon the arm 27 is pivoted the roller or cam follower 29, which engages the distorted, warped or waved lower cam face of the cam member K.

Secured to the pointer shaft 15 is the laterally extending arm 30, extending horizontally through the slot 31 in the wall of the member 12, and having adjacent its outer end a recess or socket for receiving the rounded end of the bar 32, whose other end is rounded and engages in a socket in the lower end of the bell crank arm 28. A tension spring 33 is secured at its opposite ends to the bell crank arm 28 and the arm or lever 30, thereby clamping the bar 32 between them.

As the coil A and shaft 1 are rotated by the hand wheel W, in the bearing or direction finding operation, the roller 29 moves therewith, traversing the distorted cam surface on the cam K representative of the wave front distortion, and in consequence of the upward and downward movement of the roller 29 in contact with the cam surface the bell crank lever 27, 28 is oscillated about its pivot 26, thereby transmitting similar movements through the bar 32 and the lever arm 30 to the pointer shaft 15, thereby moving the pointer P angularly with respect to the axis of the coil A and shaft 1 in such sense and to such extent as to compensate or correct for the wave front distortion, and thereby causing the outer or reading end of the pointer P to take such position with respect to the scale S as to correspond with the true, as distinguished from the apparent, bearing or direction of the distant radio beacon or transmitter.

While in the foregoing description the scale S is fixed, or from time to time adjusted in position as a dumb compass card, it will be understood that my apparatus is utilizable as well in connection with the movable cards of magnetic compasses or of gyroscopic compasses or repeaters. For this purpose, the pointer shaft 15 may extend downwardly through the block or plug 14 of the member 12, in which case the pointer P is secured to the shaft 15 below the member 12, as indicated in Fig. 7, where it coacts with the card or scale S of a magnetic or gyroscopic repeater or other compass.

By utilization of cam structure of the character herein described, whereof it is characteristic that the cam surface is normal to the axis of rotation of the directional and indicating members, errors of comparatively large magnitude can be compensated for or corrected with but slight deformation or warping of the disk or cam K. The structure further assures a degree of permanency in the settings or the formation of the disk or cam greater than in the case of the ring type cam, in which the cam surface is substantially parallel with the axis of rotation of the directional and indicating members. In addition, the structure is remarkably simple and cheap, and, furthermore, is compact, occupying but slight space, which is of decided advantage in the environment in which utilized.

What I claim is:

1. Radio apparatus comprising an electrical system having a non-uniform directional characteristic, a rotatable member in said electrical system, an indicating member co-acting with said rotatable member, and means for automatically varying the position of said indicating member with respect to said rotatable member comprising a cam surface disposed substantially normal to the axes of rotation of said rotatable member and of said indicating member, and a cam follower engaging said surface for controlling the position of said indicating member with respect to said rotatable member.

2. Radio apparatus comprising an electrical system having a non-uniform directional characteristic, a rotatable member in said electrical system, an indicating member co-acting with said rotatable member, and means for automatically varying the position of said indicating member with respect to said rotatable member comprising a fixed cam having a cam surface substantially normal to the axis of rotation of said rotatable member, and a cam follower movable with said rotatable member and engaging said surface for controlling the position of said indicating member with respect to said rotatable member.

3. The combination with a radio compass comprising an electrical system having a non-uniform directional characteristic of reception of electro-radiant energy from a distant beacon or transmitter, a rotatable member in said electrical system, a rotatable shaft for said member, and a direction-indicating member, of a cam member having a cam surface substantially normal to the axes of rotation of said shaft and of said direction-indicating member and representing wave front distortion, and a cam follower engaging said surface and effecting movement of said direction-indicating member with respect to said shaft, to correct for wave front distortion.

4. The combination with a radio compass comprising an electrical system having a non-uniform directional characteristic of reception of electro-radiant energy from a distant beacon or transmitter, a rotatable member in said electrical system, a rotatable shaft for said member, and a direction-indicating member, of a fixed cam member having a cam surface substantially normal to the axis of rotation of said shaft and representing wave front distortion, and a cam follower carried by said shaft engaging said cam surface and effecting movement of said direction-indicating member with respect to said shaft, to correct for wave front distortion.

5. The combination with a radio compass comprising an electrical system having a non-uniform directional characteristic of reception of electro-radiant energy from a distant beacon or transmitter, a rotatable coil in said system absorbing energy directly from the natural medium, a shaft for said coil, and a direction-indicating member, of a cam member having a cam surface substantially normal to the axis of rotation of said shaft and representing wave front distortion, and a cam follower engaging said surface and effecting movement of said direction-indicating member with respect to said shaft, to correct for wave front distortion.

6. The combination with a radio compass comprising an electrical system having a non-uniform directional characteristic of reception of electro-radiant energy from a distant beacon or transmitter, a rotatable coil in said system absorbing energy directly from the natural medium, a shaft for said coil, and a direction-indicating member, of a fixed cam member having a cam surface substantially normal to the axis of rotation of said shaft and representing wave front distortion, and a cam follower carried by said shaft engaging said cam surface and effecting movement of said direction-indicating member with respect to said shaft, to correct for wave front distortion.

7. Indicating apparatus comprising a pointer and scale one of which is rotatable with respect to the other, a rotatable member carrying one of said relatively movable elements, and means for automatically varying the position of said one of said relatively movable elements about the axis of said rotatable member comprising a cam having a cam surface substantially normal to the axis of rotation of said rotatable member, and a cam follower engaging said surface and effecting movement of said one of said relatively movable elements with respect to said rotatable member.

8. Indicating apparatus comprising a pointer and scale one of which is rotatable with respect to the other, a rotatable member carrying one of said relatively movable elements, and means for automatically varying the position of said one of said relatively movable elements about the axis of said rotatable member comprising a cam having a cam surface deformable in directions substantially parallel to the axis of rotation of said rotatable member, and a cam follower engaging said surface and effecting movement of said one of said relatively movable elements with respect to said rotatable member.

9. Indicating apparatus comprising a rotatable shaft, an indicating member carried thereby, a cam-supporting member, a deformable cam carried by said supporting member, a circumferential series of adjusting screws carried by said supporting member and attached to and rotatable with respect to said cam for adjusting the cam surface thereof to different distances longitudinally of the axle of rotation of said rotatable member, and a cam follower engaging said surface and effecting relative adjustment of said indicating member with respect to said rotatable member.

10. Indicating apparatus comprising a rotatable shaft, an indicating member carried thereby, a cam-supporting member extending circumferentially of the axle of said shaft and having a peripheral ledge, a deformable cam member, a circumferential series of adjusting members carried by said ledge for adjusting the cam surface of said cam to different distances longitudinally of the axis of rotation of said rotatable member, and a cam follower engaging said surface and effecting relative adjustment of said indicating member with respect to said rotatable member.

11. Indicating apparatus comprising a rotatable shaft, an indicating member carried thereby, a cam-supporting member extending circumferentially of the axis of said shaft and having a peripheral ledge, a deformable cam member, a circumferential series of adjusting members carried by said ledge for adjusting the cam surface of said cam to different distances longitudinally of the axis of rotation of said rotatable member, a cam follower engaging said surface and effecting relative adjustment of said indicating member with respect to said rotatable member, and a removable cover member carried by said cam-supporting member and enclosing said ledge and said adjusting members.

12. Indicating apparatus comprising a rotatable shaft, a tubular member aligned with and carried by said shaft, an indicating member, a shaft carrying said indicating member and rotatable within said tubular member, a cam member, and a cam follower engaging said cam member and effecting rotation of said second named shaft.

13. Indicating apparatus comprising a rotatable shaft, a tubular member aligned with and carried by said shaft, an indicating member, a shaft carrying said indicating member and rotatable within said tubular member, a cam member, a bell crank lever pivoted relatively to said tubular member, a cam follower engaging said cam member and carried on one arm of said bell crank lever, and a connection from the other arm of said bell crank lever to said second shaft for rotating it with respect to said first named shaft.

14. Indicating apparatus comprising a rotatable shaft, a tubular member aligned with and carried by said shaft, an indicating member, a shaft carrying said indicating member and rotatable within said tubular member, a cam member, a bell crank lever pivoted relatively to said tubular member, a cam follower engaging said cam member and carried on one arm of said bell crank lever, an arm extending radially from said second named shaft, and a connection therefrom to the other arm of said bell crank lever for effecting rotation of said second shaft with respect to said first shaft.

15. Indicating apparatus comprising a rotatable shaft, a tubular member aligned with and carried by said shaft, an indicating member, a shaft carrying said indicating member and rotatable within said tubular member, a cam member, a bell crank lever pivoted relatively to said tubular member, a cam follower engaging said cam member and carried on one arm of said bell crank lever, an arm extending radially from said second named shaft, a rod connecting said last named arm and a second arm of said bell crank lever, and a spring connecting said last named arms.

16. Radio apparatus comprising an electrical system having a non-uniform directional characteristic, a rotatable member in said electrical system, an indicating member co-acting with said rotatable member, and means for automatically varying the position of said indicating member with respect to said rotatable member comprising a deformable cam, a member for supporting said cam, a series of adjusting screws threaded with respect to said supporting member and attached to and rotatable with respect to said cam for deforming the cam surface thereof, said cam surface extending substantially normal to the axis of rotation of said rotatable member, and a cam follower engaging said cam surface and effecting movement of said indicating member with respect to said rotatable member.

17. Indicating apparatus comprising a rotatable shaft, an indicating member rotatable about the axis of rotation of said shaft, a cam surface disposed in a plane substantially at right angles to said axis and deformable longitudinally thereof, and a cam follower engaging said surface and during movement of said rotatable shaft effecting relative movement of said indicating member and said shaft.

18. Indicating apparatus comprising a rotatable shaft, an indicating member rotatable about the axis of rotation of said shaft, an annular cam member disposed at right angles to and symmetrical about said axis, and deformable longitudinally thereof, and a cam follower engaging said surface and during movement of said rotatable shaft effecting relative movement of said indicating member and said shaft.

19. Indicating apparatus comprising a rotatable shaft, an indicating member, a shaft therefor coaxial with said first shaft, a cam surface disposed in a plane substantially normal to said axis and deformable in directions parallel thereto, a cam follower engaging said surface, and motion translating means interposed between said cam follower and said second shaft to effect relative movement of said shafts during movement of one of them.

20. Indicating apparatus comprising a rotatable shaft, an indicating member, a shaft therefor coaxial with said first shaft, a cam surface disposed in a plane substantially normal to said axis and deformable in directions parallel thereto, a cam follower rotated by said first shaft in a plane parallel to said surface and having a component of motion at right angles to said plane, and means connecting said cam follower and said second shaft to effect rotation of said second shaft to an extent differing from the extent of rotation of said first shaft by an amount proportional to said right angular movement of said cam follower.

WILLIAM M. BROWER.